Sept. 1, 1936. R. E. SPOKES 2,052,808
BACKING FOR COMPOSITION FRICTION ELEMENTS
Filed Dec. 11, 1934
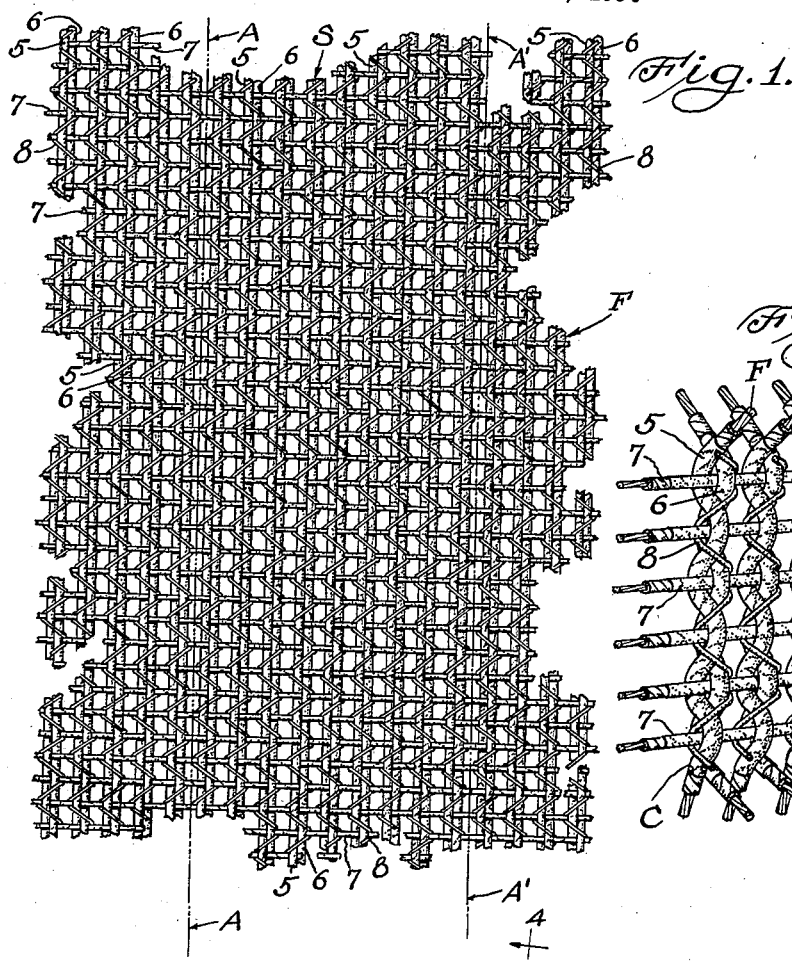
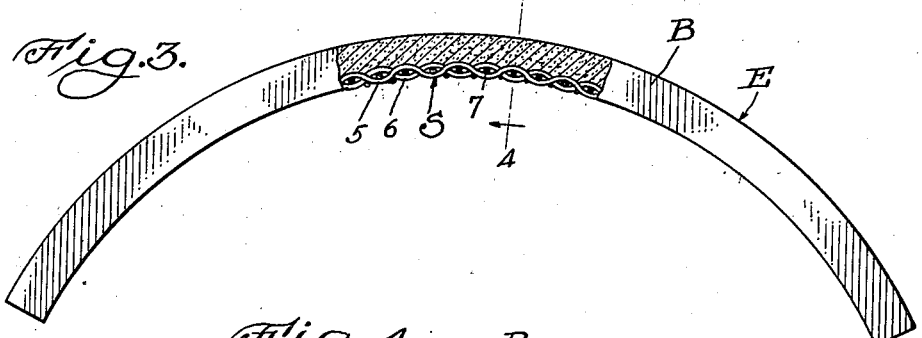
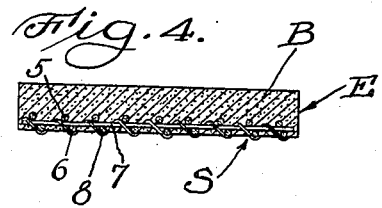
Inventor
Ray E. Spokes
BY
Wm. O. Bell
Attorney.

Patented Sept. 1, 1936

2,052,808

UNITED STATES PATENT OFFICE 2,052,808

BACKING FOR COMPOSITION FRICTION ELEMENTS

Ray E. Spokes, Ann Arbor, Mich., assignor to American Brakeblok Corporation, New York, N. Y., a corporation of New York Application December 11, 1934, Serial No. 756,949

7 Claims. (Cl. 28—1)

This invention relates to composition friction elements and more particularly to a novel backing therefor.

Composition friction elements have been made as blocks, strips, and in other forms of various shapes and sizes and have included backs or backings embedded or otherwise secured in the composition material thereof to protect the material, to reenforce the element, and to expedite mounting the element on the support therefor in a brake couple. Heretofore such backs or backings have been made of sheet metal, wire mesh, or other reticulated metal or of canvas or other heavy fabric material. Metal backs are more or less stiff and may detract from the flexibility of the element. Further, if an element is permitted to wear down in service in a brake couple, the metal back thereof may engage the drum during operation of the couple and cause squealing or score the drum. Moreover, in a composition friction element it is difficult to attain a firm bond between a canvas or other heavy fabric backing and the composition body material because the body material does not properly pass through the interstices in such fabrics to be anchored therein.

A convenient method for making composition friction elements in strip form is to continuously force the composition material for the elements to a pair of rotating forming and packing rollers and to pass the material between these rollers, simultaneously with the passage of the backing in strip form therebetween, so that as the material and backing pass between the rollers the body material is compressed and packed into the backing to embed the backing in one face of the compressed material. In such an operation the rollers exert a pressure of as much as two to three thousand pounds per square inch and attempts to use fabric backings, of the kind heretofore known and having interstices large enough to receive the material, have met with failure because the pressure broke the threads of the backing or so displaced the threads that the backing could not serve its intended purpose. Moreover, the pressure tended to crush the threads of the backing and thereby materially weaken it.

Lint on the threads of fabric backings of the kind heretofore known has sometimes clogged the interstices in the backing and prevented the body material from properly passing through the interstices for anchorage therein and if the threads of the backing are not truly round the body material does not properly anchor thereon and because of these and kindred deficiencies it has been difficult to firmly anchor a fabric backing in the body material.

Backings for friction elements are usually in the form of long narrow strips, and it is desirable to cut such strips from wide sheets of fabric for it is more economical to weave the fabric in wide sheets. But strips cut from wide sheets have been found to fray along the cut edges thereof and such fraying has rendered the edges so ragged that the strips have not been suitable for use as backings in friction elements.

It is customary to cure composition friction elements by subjecting them to heat for protracted periods and such heating and fumes released from the composition body material during heating have been found to detrimentally affect fabrics heretofore used as backings for friction elements to such an extent that the fabrics have been rendered useless as backings.

The objects of my invention are to provide a novel fabric suitable for use as a backing for a composition friction element and which may be firmly embedded in a face of the composition body of such an element; wherein the threads will not break or displace when subjected to pressure incidental to compressing the composition material and packing it into the fabric; wherein the interstices afford unobstructed passage of the body material therethrough and the threads afford firm anchorage for the body material; which may be woven in wide sheets that may be subsequently divided into a plurality of strips of desired width that will not fray along the cut edges; and which will not be deleteriously affected by heat or fumes in the cure of the elements.

More specific objects are to impart a high twist to the threads of the fabric to increase the strength thereof and render them truly round; to size the threads before weaving the fabric to lay the lint thereon and thereby prevent clogging of the interstices in the fabric; to lock the threads of the fabric against displacement by weaving locking threads through the fabric to bind the warp and weft threads together at the intersections thereof; and to coat the fabric with a material which will secure the threads thereof in position and also protect the fabric against the deleterious effects of heat, fumes and the like.

A selected embodiment of my invention is illustrated in the accompanying drawing wherein Fig. 1 is an elevational view of a section of fabric which may be divided into strips to afford backings for composition friction elements;

Fig. 2 is a perspective view drawn to an enlarged scale and illustrating the weave of the fabric;

Fig. 3 is a side elevation of a friction element, a part of which is broken away, and of which my novel backing is a part; and Fig. 4 is a transverse sectional view taken substantially on the line 4—4 on Fig. 3.

In the preferred form of my invention I use threads having metallic cores made up of a plurality of fine wires preferably of soft metal such as brass. These fine wires are encased in a covering of fibrous material such as asbestos, cotton, hemp or the like. While the heat resistive properties of asbestos render it a desirable covering for the wire core, the asbestos may advantageously be reenforced by combining it with a stronger fibrous substance. I have found a satisfactory covering for the soft wire core to be a yarn made up of about eighty-five percent asbestos and about fifteen percent cotton. The cotton reenforces the asbestos but since the yarn is predominantly asbestos it effectively resists the deleterious effects of heat.

The yarn is wound about the soft wire core to provide a thread. Such thread is highly twisted to impart maximum strength thereto and make the thread truly round in cross section. The high twisting prevents flattening of the thread when it is subjected to pressure in the manufacture of the friction element for such twisting makes the thread substantially solid.

Threads produced in this manner are woven into a fabric having relatively large interstices or openings between the threads thereof, that is to say, the openings are sufficiently large to permit the body material of a composition friction element to freely pass therethrough in the packing operation in the manufacture of the element but the openings are sufficiently restricted to insure anchorage of the body material therein. However, loose lint on the periphery of the threads might clog the openings or interstices in the fabric and I therefore lay the lint, prior to weaving, by sizing the threads by passing them through a two percent cornstarch bath. A preferred manner of so treating the threads is to direct the threads through the bath and then over suitable drying means as they pass to the loom.

It is more economical to weave the fabric backing in wide sheets and to then divide such sheets into strips of the required width. Thus in the accompanying drawing I have illustrated a section of a wide sheet of fabric F which may be cut parallel with the warp threads thereof at intervals, as for example, along the lines A—A, A'—A', to provide elongated narrow strips, indicated by S, which are used as the backing in composition friction elements.

A fabric backing for a friction element must have a strong warp so that it will withstand the stresses and strains to which such backings are subjected and this can be attained by arranging the warp threads in pairs. In the fabric shown in the accompanying drawing the warp comprises a plurality of pairs of juxtaposed threads 5 and 6 arranged at regular spaced intervals across the fabric. The weft threads 7 ordinarily need not be as stout as the warp threads 5 and 6 and therefore the weft threads need not be as large as the warp threads. In the illustrated form of the invention the warp threads 5 and 6 are slightly more than twice as large as the weft threads 7 although it is to be understood that warp and weft threads of variated sizes other than those set forth, or of the same size, may be used without departing from the purview of the invention, the size being dictated by the strength required for the threads which is determined by the characteristics needed in the fabric.

Adjacent weft threads traverse the warp threads oppositely, that is, if one weft thread passes above a warp thread the weft threads adjacent thereto pass below this warp thread. Thus, in the illustrated form of the invention where one weft thread 7 passes under a warp thread 5 of a pair of warp threads it passes over the warp thread 6 of this pair uniformly across the fabric and the weft threads adjacent to this particular weft thread pass over the warp thread 5 of said pair of warp threads and under the warp thread 6 of the pair uniformly across the fabric. In this way a firm interlock between the warp and weft threads is afforded which may be sufficient for a backing suitable for many types of composition friction elements.

However, I prefer to lock the warp and weft threads together to insure against displacement of these threads when the backing is subjected to pressure and other stresses and strains. To this end I provide a locking thread along each pair of warp threads. These locking threads, indicated by 8 in the drawing, are much smaller than the warp and weft threads and are preferably linen, cotton or the like and of sufficient strength that they will not be broken when the backing is subjected to stresses and strains. Each locking thread extends diagonally between adjacent weft threads and in opposite directions from each weft thread. Furthermore, in order to lock the warp and weft threads together at the intersections thereof a locking thread passes below a weft thread oposite a warp thread which passes over this weft thread. Thus, a locking thread 8 passes under a weft thread 7 opposite to a warp thread 6 which passes over this weft thread and then the locking thread 8 extends diagonally over the warp threads 5 and 6 to pass under the adjacent weft thread 7 opposite a warp thread 5 passing thereover and then back over the warp threads 5 and 6 to again pass under a weft thread 7 opposite a warp thread 6 and then again over the warp threads 5 and 6 and under a weft thread opposite a warp thread 5 uniformly throughout the fabric. Thus, the locking threads 8 act in opposition to a warp thread at each place they pass under a weft thread 7 and in this manner they coact with the warp and weft threads to interlock these threads at the intersections thereof.

The width of each of the strips S is determined by the width of the friction element E in which it is to be used and preferably each strip S is slightly narrower than the body B of the friction element. Therefore when a sheet of fabric is divided along the warp threads into strips S it may be that a line of cut will pass through the fabric close to or through a pair of warp threads and the locking thread 8 along these warp threads may be severed which might permit fraying of the strip along this edge thereof. Furthermore, as can be seen by referring to Figs. 3 and 4, the fabric backing is only partially embedded in one face of the composition body material of the friction element and a part of the fabric backing is exposed on the rear face of the element. The exposed part of the fabric backing will be subjected to heat and fumes from the body material during the cure of the friction element. Therefore, to prevent fraying of the strip along the edges thereof and to protect the threads of the backing from the deleterious effects of heat and fumes during the cure of the element, I apply a coating on the fabric backing.

A suitable coating and a satisfactory way of applying the same is as follows: I pass the fabric through a bath consisting of a solution of smoked sheet rubber, carbon black, sulphur and naphtha, which adheres to the fabric as it passes therethrough to form an unvulcanized rubber coating thereon. As the fabric passes from the bath I direct it through squeezer rollers and then past a current of air which blows the coating out of the interstices in the fabric and the air evaporates the naphtha and reduces the tackiness of the coating so that the fabric may be rolled to permit storage thereof until it is used when it is divided into strips S. When the fabric is so divided the unvulcanized rubber coating thereon holds the threads of the strips in position and prevents fraying along the edges thereof.

The strips S into which the fabric is divided are coiled or otherwise packaged and in the manufacture of a friction element in strip form such a strip is passed between forming and packing rollers simultaneously with the body material of the friction element and the rollers compress the body material and pack it into the interstices in the fabric and about the round threads thereof so that the body material is firmly anchored in the backing accorded by the strip. The manufacture of the friction element is completed by curing the compressed body material having the backing anchored therein by subjecting it to heat. During the initial part of the heating the unvulcanized rubber coating on the backing is vulcanized by the heat and the vulcanized coating thus afforded effectively protects the back against the deleterious effects of heat and fumes released from the body material during the cure.

The interlocking of the warp and weft threads prevents displacement of the threads of the backing and the metallic cores and high twist of the warp and weft threads strengthens these threads so that they are not broken during the packing operation in the manufacture of the friction elements. Therefore, since the strips S are narrower than the composition bodies of the elements these strips neatly fit in the rear faces of the composition bodies and provide a satisfactory backing for the friction elements. The coating applied to the backing holds the threads along the edges of the strips in place and prevents fraying along the edges of the strips and this coating also protects that part of the backings exposed on the rear faces of the elements, particularly during the cure of the elements.

The backing of this invention is particularly useful in composition friction elements in which the composition body is united with the fabric backing in the process of manufacture by simultaneously passing the backing in strip form between rotating forming and packing rollers to which the composition material of the body is also fed. These rollers and cooperating material confining elements highly compress the material and force it into the openings between the threads of the backing. Very high pressure and stresses are impressed on the backing by this operation but the backing of this invention effectively resists these stresses and the threads of my novel backing are not flattened, displaced nor broken and the composition body material freely passes through relatively large openings afforded between the threads wherefore the composition body material becomes firmly united with the threads and remains compressed and united with the threads after passing from the rollers particularly by reason of the high pressure to which the composition body is subjected. Ordinary fabrics do not become properly united with composition body material even when passed between rotating forming and packing rollers and the threads of such backing are flattened, displaced or broken by the action of the rollers.

In the foregoing I have described a selected embodiment of my invention but it is to be understood that this is capable of variation and modification and I therefore do not wish to be limited to the precise details set forth but desire to avail myself of such changes and alterations as fall within the purview of the following claims:

I claim:

1. In a composition friction element which has a composition body, the combination therewith of a fabric backing embedded in one face of the body and comprising a plurality of warp threads arranged in pairs at spaced intervals across the backing, a plurality of weft threads passing across said warp threads in spaced relation with each other, the weft threads alternately passing above and below the warp threads, the spacing of the pairs of warp threads from each other and the spacing of the weft threads from each other affording relatively large openings in the fabric in which the composition body is embedded, said warp and weft threads each comprising a metallic core and a fabric covering about the core including asbestos to render said threads substantially fireproof, and locking threads passing diagonally over the pairs of warp threads in opposite directions on opposite sides of each weft thread longitudinally of the fabric and under each weft thread in opposition to a warp thread passing thereover, the locking threads being smaller than the warp and weft threads so as not to restrict the size of the openings in the backing in which the composition body is embedded.

2. In a composition friction element which has a composition body, the combination therewith of a fabric backing embedded in one face of the body and comprising a plurality of warp threads arranged in pairs at spaced intervals across the backing, a plurality of weft threads passing across said warp threads in spaced relation with each other, alternate of the weft threads passing over one warp thread and under the other warp thread of a pair of warp threads uniformly across the fabric, the weft threads intermediate said alternate weft threads passing under said one warp thread and over said other warp thread of a pair of warp threads uniformly across the fabric, the spacing of the pairs of warp threads from each other and the spacing of the weft threads from each other affording relatively large openings in the fabric in which the composition body is embedded, said warp and weft threads each comprising a metallic core and a fabric covering about the core including asbestos to render said threads substantially fireproof, and locking threads passing diagonally over the pairs of warp threads in opposite directions on opposite sides of each weft thread longitudinally of the fabric and under each weft thread in opposition to a warp thread passing thereover, the locking threads being smaller than the warp and weft threads so as not to restrict the size of the openings in the backing in which the composition body is embedded.

3. A fabric backing for a composition friction element having the warp threads thereof arranged in pairs at uniformly spaced intervals across the fabric and having the weft threads thereof alternately passed above and below the warp threads, said warp and weft threads each comprising a metallic core and a fabric covering about the core including asbestos to render said fabric substantially fireproof, said pairs of warp threads being spaced from each other and said weft threads being spaced from each other to provide relatively large openings in the fabric, and locking threads passing diagonally over said pairs of warp threads in opposite directions on opposite sides of each weft thread longitudinally of the fabric and under each weft thread in opposition to a warp thread passing thereover, said locking threads preventing displacement of the warp and weft threads and being of a relatively restricted size whereby the size of the openings in the fabric is not materially restricted by said locking threads.

4. A fabric backing for a composition friction element having the warp threads thereof arranged in pairs at uniformly spaced intervals across the fabric and having alternate of the weft threads thereof passed over one warp thread and under the other warp thread of a pair of warp threads uniformly across the fabric and having the weft threads thereof intermediate said alternate weft threads passed under said one warp thread and over said other warp thread of a pair of warp threads uniformly across the fabric, said warp and weft threads each comprising a metallic core and a fabric covering about the core including asbestos to render said fabric substantially fireproof, said pairs of warp threads being spaced from each other and said weft threads being spaced from each other to provide relatively large openings in the fabric, and locking threads passing diagonally over said pairs of warp threads in opposite directions on opposite sides of each weft thread longitudinally of the fabric and under each weft thread in opposition to a warp thread passing thereover, said locking threads preventing displacement of the warp and weft threads and being of a relatively restricted size whereby the size of the openings in the fabric is not materally restricted by said locking threads.

5. A fabric backing for a composition friction element having the warp threads thereof arranged in pairs at uniformly spaced intervals across the fabric and having alternate of the weft threads thereof passed over one warp thread and under the other warp thread of a pair of warp threads uniformly across the fabric and having the weft threads thereof intermediate said alternate weft threads passed under said one warp thread and over said other warp thread of a pair of warp threads uniformly across the fabric, said warp and weft threads each comprising a metallic core and a fabric covering about the core including asbestos to render said fabric substantially fireproof, said pairs of warp threads being spaced from each other and said weft threads being spaced from each other to provide relatively large openings in the fabric, locking threads passing diagonally over said pairs of warp threads in opposite directions on opposite sides of each weft thread longitudinally of the fabric and under each weft thread in opposition to a warp thread passing thereover, said locking threads preventing displacement of the warp and weft threads and being of a relatively restricted size whereby the size of the openings in the fabric is not materially restricted by said locking threads, and a non-tacky vulcanizable coating applied to the threads of the fabric as a film so as not to materially restrict the size of the openings in the fabric, said vulcanizable coating adhesively securing the threads together at the points of contact thereof and cooperating with the locking threads to prevent displacement of said threads.

6. A fabric backing for a composition friction element having the warp threads thereof arranged in pairs at uniformly spaced intervals and having alternate of the weft threads thereof passed over one warp thread and under the other warp thread of a pair of warp threads uniformly across the fabric and having the weft threads thereof intermediate the alternate weft threads passed under said one warp thread and over said other warp thread of said pair of warp threads uniformly across the fabric, said pairs of warp threads and said weft threads being spaced apart to provide relatively large openings therebetween to permit free passage of the composition material of a friction element about said threads, the warp threads being of larger diameter than the weft threads, all of said threads comprising a metallic core having a yarn covering wound thereabout, said threads being highly twisted to be rendered substantially solid and to increase the tensile strength thereof to enable the backing to withstand the stresses and strains to which it will be subjected, said twisting also rendering the threads truly round in cross section and enabling the composition material forced through the openings in the backing to anchor about the threads and embed the backing in the body material, and locking threads passing diagonally over the pairs of warp threads in opposite directions on opposite sides of each weft thread and under each weft thread in opposition to a warp thread passing thereover and preventing displacement of the pairs of warp threads and weft threads when the composition material is forced through said openings.

7. A fabric backing for a composition friction element having the warp threads thereof arranged in pairs at uniformly spaced intervals and having alternate of the weft threads thereof passed over one warp thread and under the other warp thread of a pair of warp threads uniformly across the fabric and having the weft threads thereof intermediate the alternate weft threads passed under said one warp thread and over said other warp thread of said pair of warp threads uniformly across the fabric, said pairs of warp threads and said weft threads being spaced apart to provide relatively large openings therebetween to permit free passage of the composition material of a friction element about said threads, the warp threads being of larger diameter than the weft threads, all of said threads comprising a metallic core having a yarn covering wound thereabout, said threads being highly twisted to be rendered substantially solid and to increase the tensile strength thereof to enable the backing to withstand the stresses and strains to which it will be subjected, said twisting also rendering the threads truly round in cross section and enabling the composition material forced through the openings in the backing to anchor about the threads and embed the backing in the body material, locking threads passed diagonally over said pairs of warp threads in opposite directions on opposite sides of each weft thread and under each weft thread in opposition to a warp thread passing thereover and preventing displacement of the pairs of warp threads and weft threads when the composition material is forced through said openings, and a vulcanizable coating applied to the fabric and adhesively securing the threads together at the points of contact thereof and adapted to be vulcanized to protect said threads against the deleterious effects of heat, fumes and the like.

RAY E. SPOKES.